(12) United States Patent
Jang

(10) Patent No.: US 9,280,608 B2
(45) Date of Patent: Mar. 8, 2016

(54) GROUP BOOKMARKS

(75) Inventor: Soobaek Jang, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 13/471,531

(22) Filed: May 15, 2012

(65) Prior Publication Data

US 2013/0311869 A1    Nov. 21, 2013

(51) Int. Cl.
*H04L 29/12* (2006.01)
*G06F 17/30* (2006.01)
*G06F 17/22* (2006.01)

(52) U.S. Cl.
CPC ...... *G06F 17/30884* (2013.01); *G06F 17/2241* (2013.01)

(58) Field of Classification Search
CPC .............. G06F 17/21–17/289; G06F 17/2247
USPC ......................................................... 715/234
See application file for complete search history.

(56) References Cited

U.S. PATENT DOCUMENTS

| | | | |
|---|---|---|---|
| 6,037,934 A | 3/2000 | Himmel et al. | |
| 6,041,360 A | 3/2000 | Himmel et al. | |
| 6,049,812 A | 4/2000 | Bertram et al. | |
| 6,208,995 B1 | 3/2001 | Himmel et al. | |
| 6,211,871 B1* | 4/2001 | Himmel et al. | 715/744 |
| 6,212,522 B1 | 4/2001 | Himmel et al. | |
| 6,275,862 B1 | 8/2001 | Sharma et al. | |
| 6,405,222 B1 | 6/2002 | Kunzinger et al. | |
| 6,460,060 B1 | 10/2002 | Maddalozzo, Jr. et al. | |
| 6,549,217 B1 | 4/2003 | De Greef et al. | |
| 6,725,227 B1 | 4/2004 | Li | |
| 6,832,350 B1 | 12/2004 | Bates et al. | |
| 7,251,775 B1* | 7/2007 | Astala et al. | 715/205 |
| 7,406,656 B2 | 7/2008 | Schroeder | |
| 7,519,592 B2* | 4/2009 | Hughes et al. | 1/1 |
| 7,636,886 B2 | 12/2009 | Wyle et al. | |
| 7,650,571 B2* | 1/2010 | Sinai | 715/738 |
| 8,010,532 B2 | 8/2011 | Chi et al. | |
| 2001/0011285 A1* | 8/2001 | Kanno et al. | 707/512 |
| 2002/0147742 A1 | 10/2002 | Schroeder | |
| 2002/0184095 A1 | 12/2002 | Scullard et al. | |
| 2004/0093562 A1* | 5/2004 | Diorio et al. | 715/513 |

(Continued)

FOREIGN PATENT DOCUMENTS

CN    101593187    12/2009

OTHER PUBLICATIONS

IBM, Improved Web Browser Favorites/Bookmark Function Usability, IP.com No. IPCOM000143552D, Original Publication Date: Nov. 28, 2006, 3 pages.

(Continued)

*Primary Examiner* — Cesar Paula
*Assistant Examiner* — Luu-Phuong Nguyen
(74) *Attorney, Agent, or Firm* — Cantor Colburn LLP

(57) ABSTRACT

Group bookmarks are provided. A uniform resource locator (URL) is received and parsed to identify a URL domain, a parameter, and a first parameter value. Multiple bookmarks are examined to determine whether a pattern match is found for a bookmark including the URL domain and the parameter. The bookmark has a second parameter value. The first parameter value is stored with the bookmark as a group bookmark. The group bookmark includes: the URL domain, the parameter, and entries for the first parameter value and the second parameter value.

16 Claims, 7 Drawing Sheets

(56) References Cited

U.S. PATENT DOCUMENTS

| | | |
|---|---|---|
| 2005/0022132 A1 | 1/2005 | Herzberg et al. |
| 2007/0244903 A1 | 10/2007 | Ratliff et al. |
| 2007/0282802 A1 | 12/2007 | Wilhelm |
| 2007/0298773 A1* | 12/2007 | Uematsu et al. ........... 455/414.2 |
| 2009/0199106 A1 | 8/2009 | Jonsson et al. |
| 2009/0222716 A1 | 9/2009 | Boerries et al. |
| 2009/0249179 A1 | 10/2009 | Shieh et al. |
| 2010/0050067 A1 | 2/2010 | Curwen et al. |
| 2010/0050068 A1 | 2/2010 | Usami |
| 2011/0078234 A1 | 3/2011 | Engel |

OTHER PUBLICATIONS

U.S. Appl. No. 13/550,688 Non-Final Office Action dated May 8, 2015, 19 pages.

U.S. Appl. No. 13/550,688 Notice of Allowance dated Nov. 23, 2015, 24 pages.

* cited by examiner

GROUP BOOKMARKS

BACKGROUND

The present invention relates to computer-implemented bookmark management and, more specifically, to group bookmark management.

A web browser can store bookmarks identifying a location and path to a particular web page. Many websites include web pages that use parameters to pass information that can be used to identify a unique web page configuration, user, process, or other information. It is typically up to the user of the web browser to decide how multiple bookmarks should be organized. For example, a user can manually create a folder to organize bookmarks and upon creating a new bookmark, the user can manually scroll through a list of folders and determine whether to add the new bookmark to a particular folder.

For web pages that support a variety of configurations having different parameter values, the process of manually managing bookmarks that appear the same except for underlying parameters that are passed to a particular web page can be more challenging. For example, a meeting web page may be accessed with one or more parameters to identify a particular user as a host of the meeting. If bookmarks are created based on a variety of different hosts for the same meeting web page, the user must realize the distinction between the bookmarks, modify the labels for each bookmark accordingly, and manually organize them if desired. Users may not follow a consistent pattern when manually managing bookmarks and are more prone to errors, such as failing to accurately recognize distinctions between different parameter values for the same web page. As the number of bookmarks grows, a resulting list of bookmarks may become more difficult to manage.

SUMMARY

According to one embodiment of the present invention, a system for group bookmarks is provided. The system includes a computer processor and group bookmark logic executable by the computer processor. The group bookmark logic is configured to implement a method including receiving a uniform resource locator (URL) and parsing the URL to identify a URL domain, a parameter, and a first parameter value. Multiple bookmarks are examined to determine whether a pattern match is found for a bookmark including the URL domain and the parameter, the bookmark having a second parameter value. The first parameter value is stored with the bookmark as a group bookmark, the group bookmark including: the URL domain, the parameter, and entries for the first parameter value and the second parameter value.

According to a further embodiment of the present invention, a computer program product for group bookmarks is provided. The computer program product includes a storage medium having computer-readable program code embodied thereon, which when executed by a computer processor, causes the computer processor to implement a method. The method includes receiving a uniform resource locator (URL) and parsing the URL to identify a URL domain, a parameter, and a first parameter value. Multiple bookmarks are examined to determine whether a pattern match is found for a bookmark including the URL domain and the parameter, the bookmark having a second parameter value. The first parameter value is stored with the bookmark as a group bookmark, the group bookmark including: the URL domain, the parameter, and entries for the first parameter value and the second parameter value.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to management and use of group bookmarks. In an exemplary embodiment, a computer system creates a group bookmark as a bookmark identifying a common location having different parameter values as group bookmark entries. Rather than storing a number of separate bookmarks identifying the common location, where each bookmark has a separate parameter value, embodiments store one bookmark as a group bookmark and manage parameter values as entries of the group bookmark. When a user attempts to create a new bookmark, existing bookmarks can be searched for corresponding patterns to form or add to a group bookmark. When the user later attempts to access the group bookmark, the user may be prompted to select an entry for the group bookmark to supply a corresponding parameter value when accessing the bookmarked location.

It is understood in advance that although this disclosure includes a detailed description on a particular computing environment, implementation of the teachings recited herein are not limited to the depicted computing environment. Rather, embodiments are capable of being implemented in conjunction with any other type of computing environment now known or later developed (e.g., any client-server model, cloud-computing model, etc.).

Figure 1:
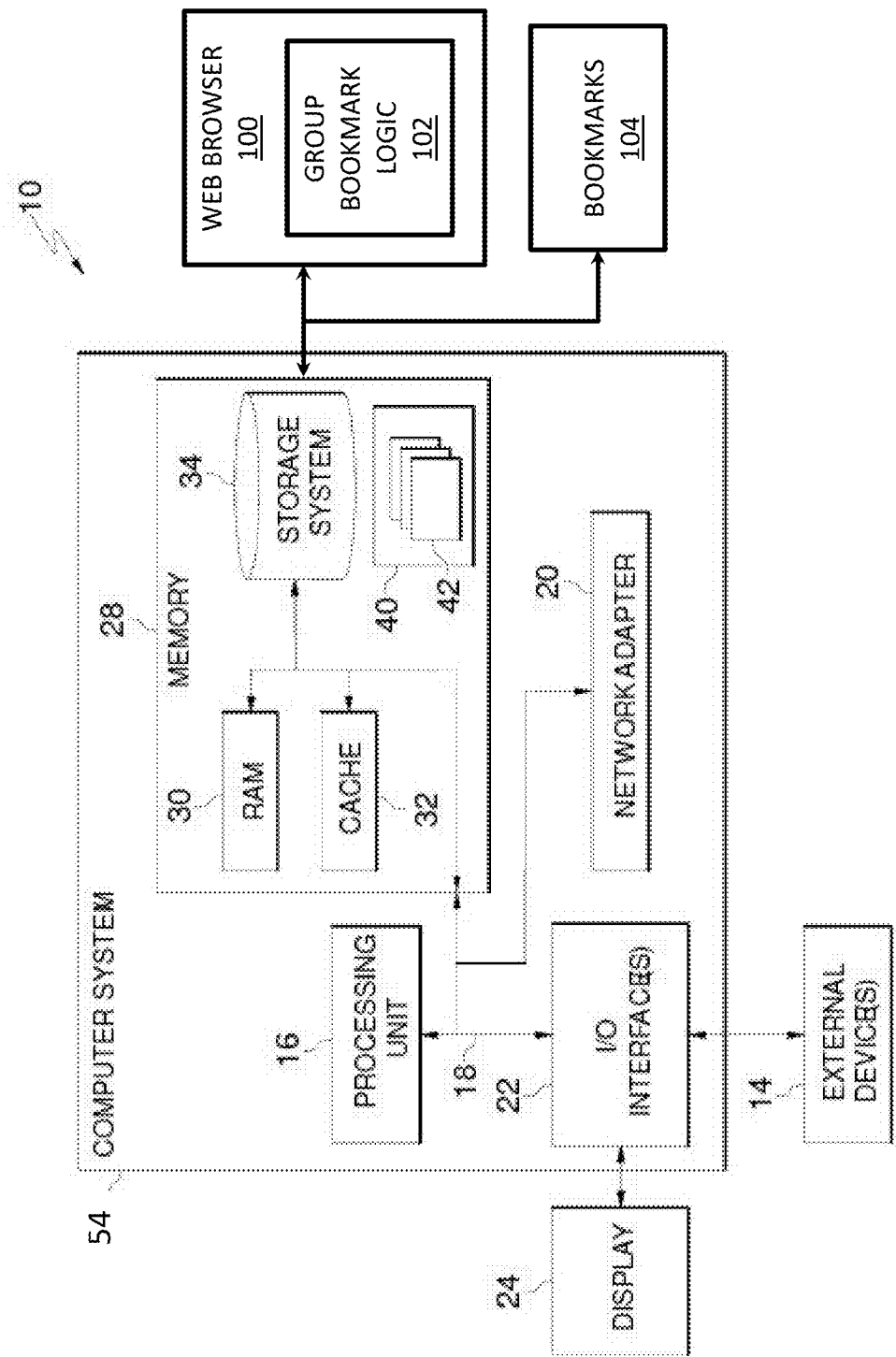
FIG. 1 depicts a computer system according to an embodiment of the present invention.

Referring now to FIG. 1, a schematic of an example of a computer system 54 in a network environment 10 is shown. The computer system 54 is only one example of a suitable computer system and is not intended to suggest any limitation as to the scope of use or functionality of embodiments of the invention described herein. Regardless, computer system 54 is capable of being implemented and/or performing any of the functionality set forth hereinabove.

In network environment 10, the computer system 54 is operational with numerous other general purpose or special purpose computing systems or configurations. Examples of well-known computing systems, environments, and/or configurations that may be suitable as embodiments of the computer system 54 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 54 may be described in the general context of computer system-executable instructions, such as program modules, being executed by one or more processors of the computer system 54. Generally, program modules may include routines, programs, objects, components, logic, data structures, and so on that perform particular tasks or implement particular abstract data types. Computer system 54 may be practiced in distributed computing environments, such as cloud computing environments, where tasks are performed by remote processing devices that are linked through a communications network. In a distributed cloud computing environment, program modules may be located in both local and remote computer system storage media including memory storage devices.

As shown in FIG. 1, computer system 54 in network environment 10 is shown in the form of a general-purpose computing device. The components of computer system 54 may include, but are not limited to, one or more computer processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 54 typically includes a variety of computer system readable media. Such media may be any available media that is accessible by computer system 54, and it includes both volatile and non-volatile media, removable and non-removable media.

System memory 28 can include computer system readable media in the form of volatile memory, such as random access memory (RAM) 30 and/or cache memory 32. Computer system 54 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. An example application program or module is depicted in FIG. 1 as web browser 100 including group bookmark logic 102 configured to access and update bookmarks 104. Although the group bookmark logic 102 is depicted within web browser 100, the group bookmark logic 102 can be incorporated in any application or module that uses bookmarks or links, such as a file navigation tool. The bookmarks 104 can be stored in storage system 34 or in other portions of memory system 28. Alternatively, the bookmarks 104 may be stored elsewhere in the network environment 10.

Computer system 54 may also communicate with one or more external devices 14 such as a keyboard, a pointing device, a display 24, etc.; one or more devices that enable a user to interact with computer system 54; and/or any devices (e.g., network card, modem, etc.) that enable computer system 54 to communicate with one or more other computing devices. Such communication can occur via I/O interfaces 22. Still yet, computer system 54 can communicate with one or more networks such as a local area network (LAN), a general wide area network (WAN), and/or a public network (e.g., the Internet) via network adapter 20. As depicted, network adapter 20 communicates with the other components of computer system 54 via bus 18. It should be understood that although not shown, other hardware and/or software components could be used in conjunction with computer system 54. Examples, include, but are not limited to: microcode, device drivers, redundant processing units, external disk drive arrays, RAID systems, tape drives, and data archival storage systems, etc.

Figure 2:
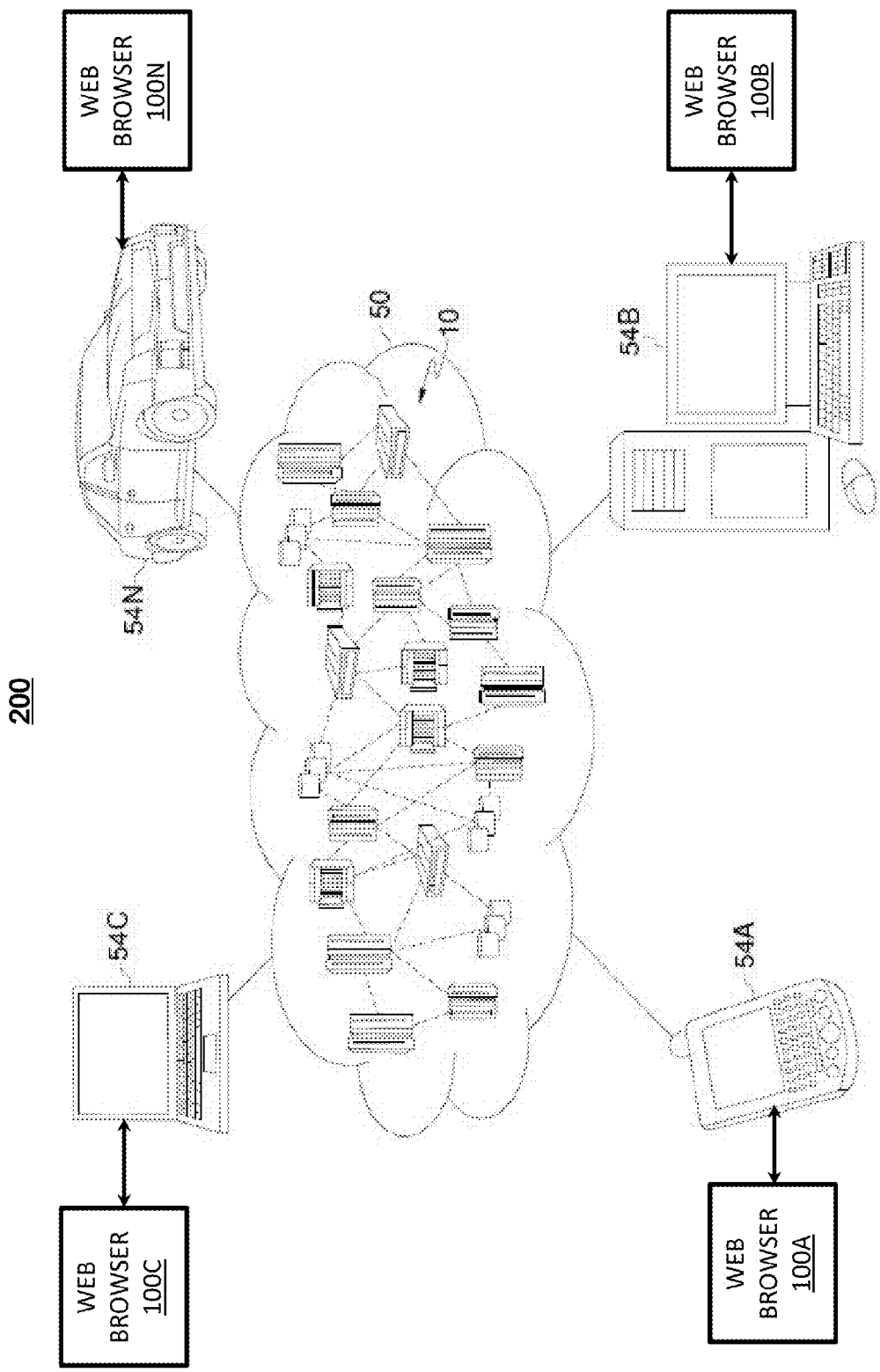
FIG. 2 depicts a network environment according to an embodiment of the present invention.

Referring now to FIG. 2, illustrative network 50 is depicted. As shown, network 50 comprises network environment 10, e.g., the Internet, with which various instances of computer system 54 communicate, such as, for example, personal digital assistant (PDA) or cellular telephone 54A, desktop computer 54B, laptop computer 54C, and/or automobile computer system 54N may communicate. Nodes, various servers, routers, switches, hubs, and links with the network environment 10 may communicate with one another. They may be grouped (not shown) physically or virtually, in one or more networks, such as Private, Community, Public, or Hybrid clouds, or a combination thereof. This allows network 50 to offer infrastructure, platforms and/or software as services that may be accessible using web browsers 100A, 100B, 100C, and/or 100N on computer systems 54A-N, as well as other applications or modules. It is understood that the types of computer systems 54A-N shown in FIG. 2 are intended to be illustrative only and the computer system 54 can be embodied in any type of computerized device over any type of network and/or network addressable connection (e.g., using a web browser). The web browsers 100A-N represent system specific embodiments of the web browser 100 of FIG. 1, where each web browser 100A-N includes group bookmark logic 102 and has access to bookmarks 104.

Figure 3:
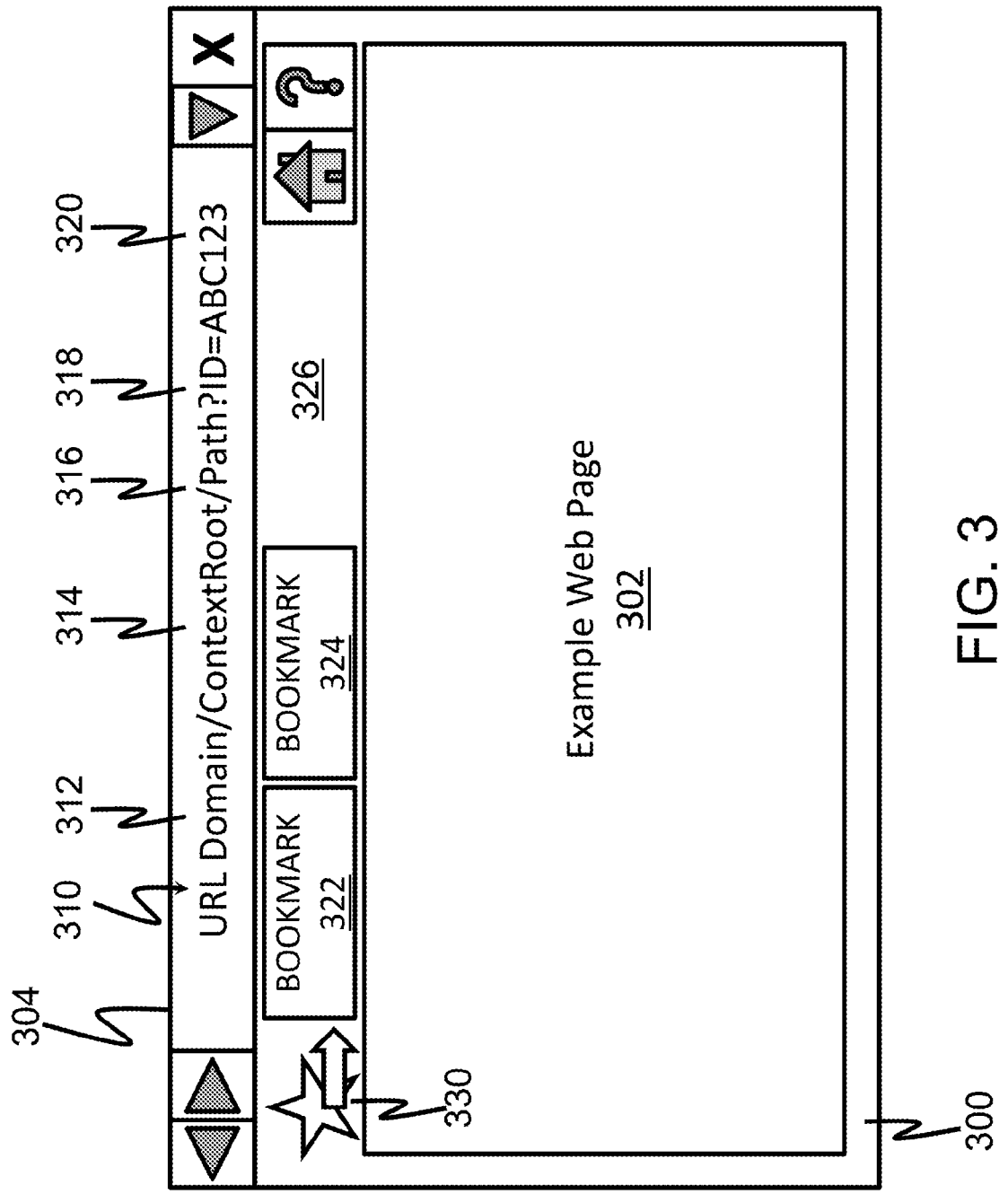
FIG. 3 depicts a user interface of a web browser according to an embodiment of the present invention.

Referring now to FIG. 3, an example of a user interface 300 of web browser 100 of FIG. 1 is depicted according to an embodiment. The user interface 300 displays a web page 302 accessible at a uniform resource locator (URL) 310 in an address bar 304. The URL 310 can be parsed into a number of elements, including a URL domain 312, a context root 314, a path 316, and a parameter 318 having a parameter value 320. The context root 314 and/or path 316 may be omitted when they not used to reach the parameter 318. In the example of FIG. 3, the parameter 318 is "ID" and has a parameter value 320 of "ABC123". While a single parameter 318 having a parameter value 320 is depicted in FIG. 3, multiple parameters with parameter values may be supported per URL 310. For example, a bookmark, such as bookmark 322, can include a set of parameters having corresponding parameter values, for instance "ID=ABC123&code=1234&name=myname" as first, second and third parameters ("ID", "code", "name") having corresponding parameter values ("ABC123", "1234", "myname"). Separate sets of parameter values can be created to correspond to each parameter in the parameter set.

The user interface 300 allows a user to quickly access particular URLs using one or more bookmarks 322 and 324. While bookmarks 322 and 324 are depicted on a toolbar 326, the bookmarks 322 and 324 may also or alternatively be accessible through a pull-down or other format. Although only two bookmarks 322 and 324 are depicted in FIG. 3, the user interface 300 supports any number of bookmarks. A user may create new bookmarks by selecting icon 330 or through other menus and commands. In the example of FIG. 3, bookmark 322 represents a prior art bookmark that includes only one URL with a static parameter value. Bookmark 324 represents a group bookmark that refers to a location having a set of defined parameter values from which a parameter value can be selected.

Figure 4:
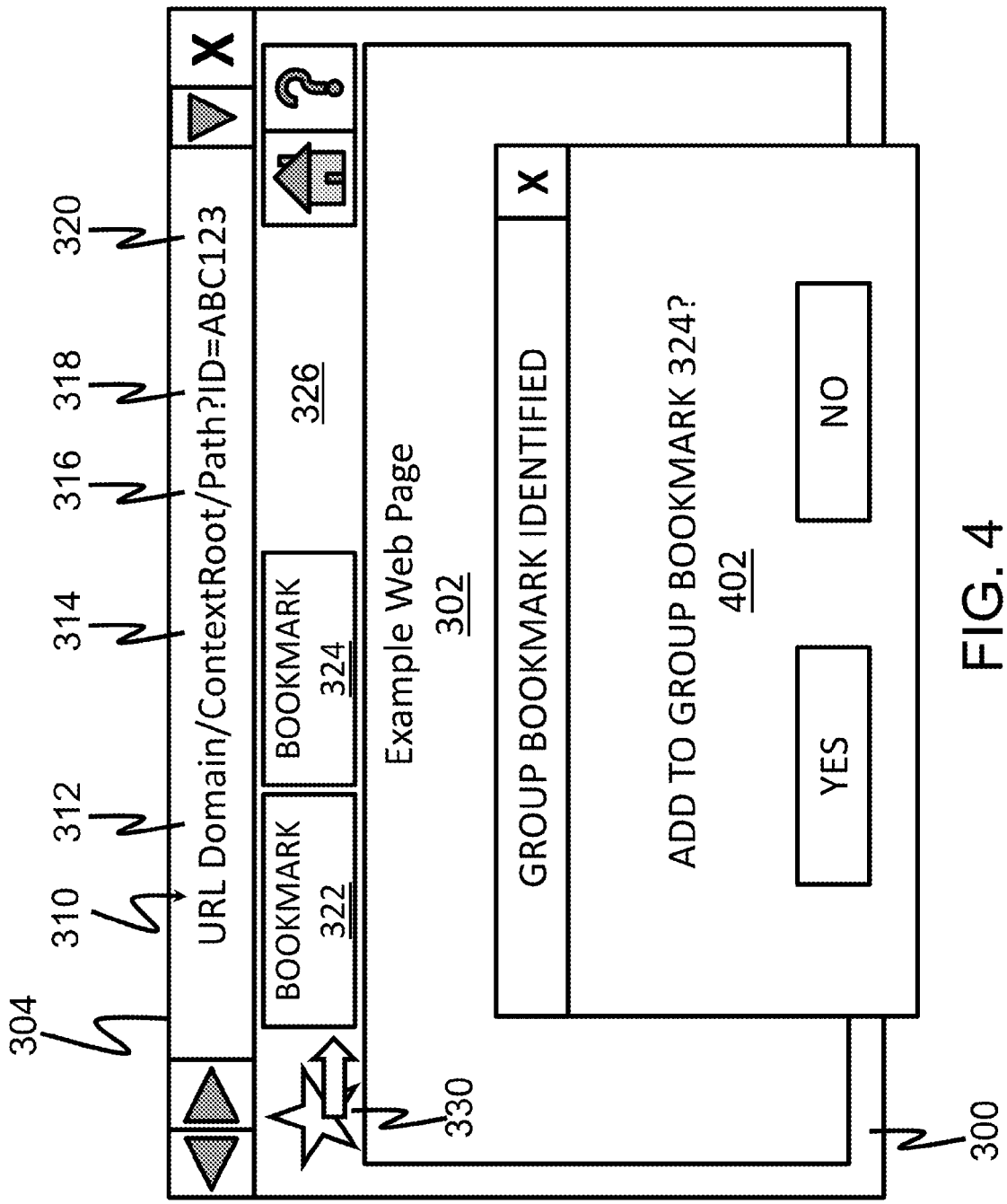
FIG. 4 depicts a group bookmark identification user interface according to an embodiment of the present invention.

When a user attempts to create a new bookmark, the group bookmark logic 102 of FIG. 1 performs pattern matching against the bookmarks 104 of FIG. 1. The group bookmark logic 102 can parse the URL 310 and check for a similar or exact match. A similar match may be found where the URL domain 310 and optionally one or more of the context root 314 and path 316 are located in the bookmarks 104. An exact match may be found where the parameter 318 is also located in the bookmarks 104. In the example of FIGS. 3 and 4, a user selects icon 330 to create a new bookmark. The group bookmark logic 102 of web browser 100 parses URL 310 into URL domain 312, context root 314, path 316, and parameter 318 having parameter value 320. The group bookmark logic 102 of web browser 100 examines the bookmarks 104 for a same or similar pattern. Upon determining that bookmark 324 is a matching bookmark, the group bookmark logic 102 of web browser 100 may prompt the user to store parameter value 320 as a group bookmark entry. An example group bookmark identification user interface 402 is depicted in FIG. 4. If bookmark 324 was not already a group bookmark, it can be transformed into a group bookmark format, where the group bookmark format includes a base URL, multiple parameter values per parameter, and optionally a label for each of the parameter values. If the bookmark 324 is already in the group bookmark format, an entry for the parameter value 320 is created, and the user can optionally be prompted to define a label associated with parameter value 320. The user may also be prompted to set the parameter value 320 as a default parameter value for the bookmark 324.

Some URLs may include a set of parameters, where each parameter of the set of parameters has a corresponding parameter value. Accordingly, the group bookmark logic 102 can also support sets of parameters for each group bookmark, where a group bookmark includes a set of parameters and a corresponding set of one or more parameter values for each parameter to access a URL with the set of parameters and selected corresponding parameter values.

While an interactive group bookmark creation sequence is depicted in FIGS. 3 and 4, other methods of creating and modifying group bookmarks can be employed by the web browser 100. For example, a menu option or configuration icon may be available through the web browser 100 to manually edit, configure, or create group bookmarks without first navigating to the URL.

Figure 5:
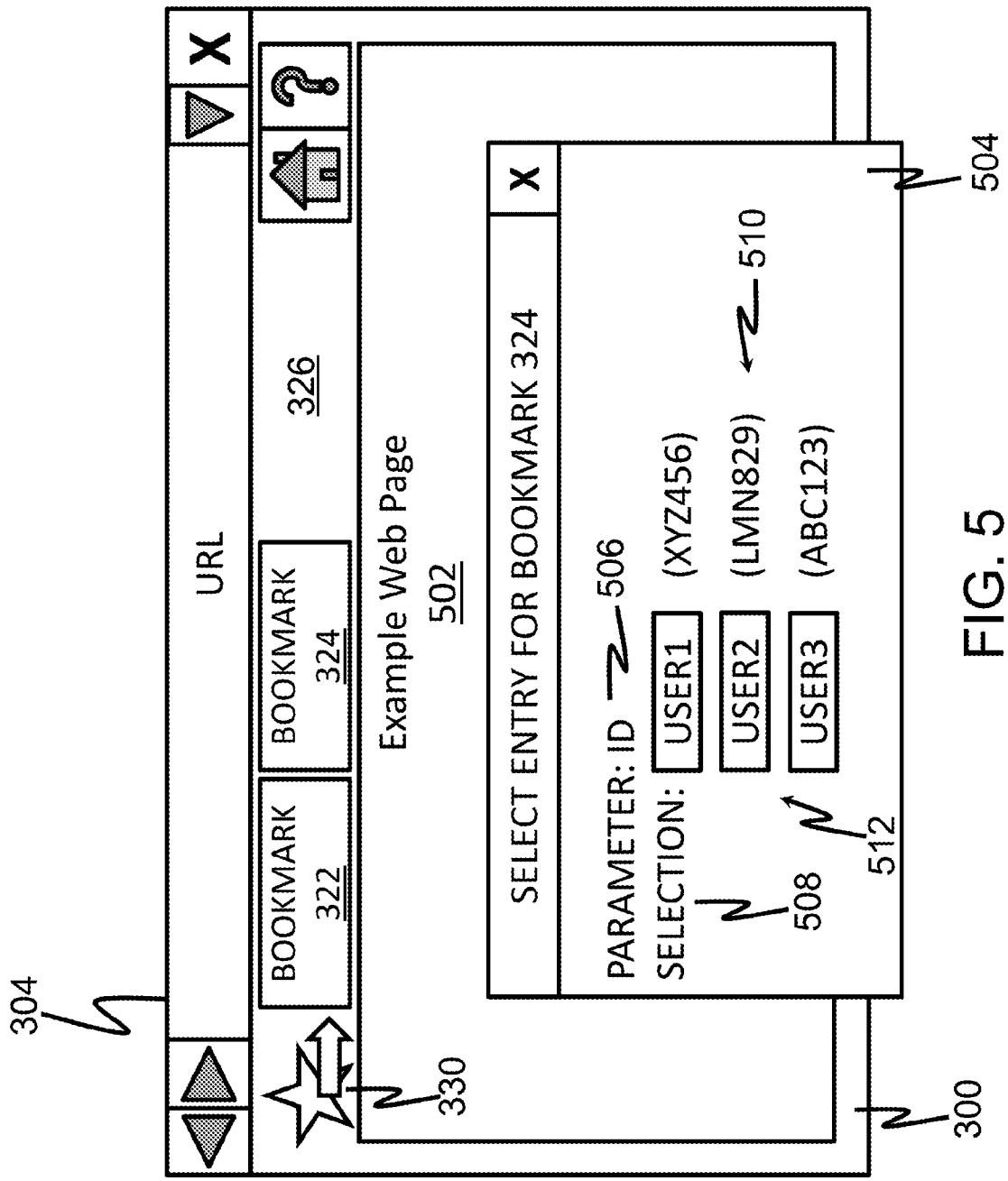
FIG. 5 depicts a bookmark entry selection user interface according to an embodiment of the present invention.

When interacting with user interface 300, a user may select a group bookmark, such as bookmark 324, as a targeted URL. Upon determining that the user has selected a bookmark, the group bookmark logic 102 of web browser 100 examines the bookmarks 104 to determine if a single target URL is associated with the selected bookmark or if the selected bookmark is a group bookmark. In the example of FIG. 5, the user has navigated to web page 502 and desires to navigate to bookmark 324. Upon determining that bookmark 324 is a group bookmark, the group bookmark logic 102 of web browser 100 can display a bookmark entry selection user interface 504. The bookmark entry selection user interface 504 may identify a parameter 506 and a group of parameter values 508 from which the user can make a selection. Parameter values 510 of the group of parameter values 508 may also have associated labels 512 to assist the user in understanding the associated meaning of each of the parameter values 510. Each of the parameter values 510 and/or labels 512 may be formatted as hyperlinks that populate the URL domain 312, context root 314, path 316, and parameter 318 of bookmark 324 into address bar 304 and the associated parameter value selected from the parameter values 510 and/or labels 512. Although only a single parameter 506 is depicted in FIG. 5, it will be understood that each group bookmark can support multiple parameters, each having a group of parameter values.

As a further option, if one of the parameter values 510 is configured as a default parameter value, then selecting the bookmark 324 will navigate directly to the URL including the default parameter value. Use of the default parameter value may be a default action performed in response to a left click of a mouse when bookmark 324 is selected. A right click of a mouse when bookmark 324 is selected may display a pop-up list of options, such as parameter 506 and the group of parameter values 508 from which a selection can be made. Group bookmarks can also be selected from a menu option or a "favorites" icon.

Figure 6:
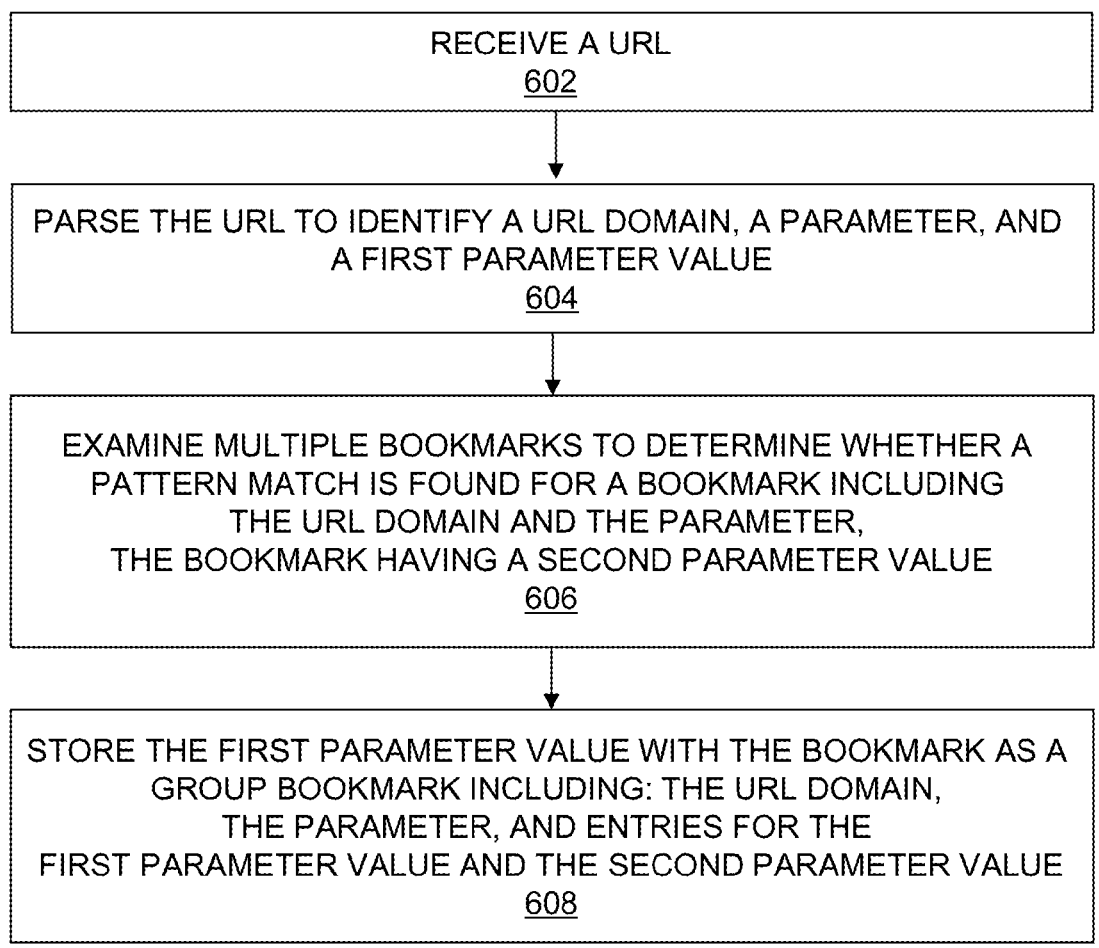
FIG. 6 depicts a flow diagram of a process for managing a group bookmark according to an embodiment of the present invention.

Turning now to FIG. 6, a process 600 for managing group bookmarks will now be described in an exemplary embodiment. The process 600 is described in reference to FIGS. 1-5 and can be implemented in the web browser 100 of FIG. 1 and variations thereof as depicted in web browsers 100A-N in FIG. 2. For ease of explanation, the process 600 is described in reference to web browser 100 and group bookmark logic 102 of FIG. 1.

At block 602, a URL, such as URL 310 of FIG. 3, is received at the web browser 100 based on a request to create a new bookmark. The web browser 100 can provide the bookmark creation request and the URL to group bookmark logic 102.

At block 604, the group bookmark logic 102 parses the URL to identify a URL domain, a parameter, and a first parameter value, such as URL domain 312, parameter 318, and parameter value 320 of FIG. 3. When parsing the URL, the group bookmark logic 102 may also identify one or more of a context root and a path, such as context root 314 and path 316 of FIG. 3.

At block 606, the group bookmark logic 102 examines multiple bookmarks 104 to determine whether a pattern match is found for a bookmark. The pattern match may be based on matching the URL domain and the parameter of the URL with one of the bookmarks 104. The pattern match may also be based on matching one or more of the context root and the path. When a matching bookmark is identified, it may include a second parameter value that is different in value from the first parameter value, where both the first and second parameter values are separately selectable options for the parameter.

At block 608, the group bookmark logic 102 stores the first parameter value with the matching bookmark as a group bookmark. If the matching bookmark is stored in a prior art format, it is converted into a group bookmark format. If the matching bookmark is already in a group bookmark format, the first parameter value is added as an entry in the group bookmark. The group bookmark includes the URL domain, the parameter, and entries for the first parameter value and the second parameter value. The group bookmark may also include the context root and/or the path. A first label associated with the first parameter value may be stored to the group bookmark. The first label can be user configurable to more clearly identify the first parameter value. If the matching bookmark is converted into the group bookmark, the group bookmark logic 102 may also prompt the user to input a label for the second parameter value. The group bookmark logic 102 may set one of the first parameter value and the second parameter value as a default parameter value in response to a user selection. The process 600 can also support a URL having a set of parameters, where each parameter in the set of parameters has a corresponding parameter value. For such a URL, a group bookmark includes the URL domain, the set of parameter, and entries for the corresponding set of one or more parameter values for each parameter.

Figure 7:
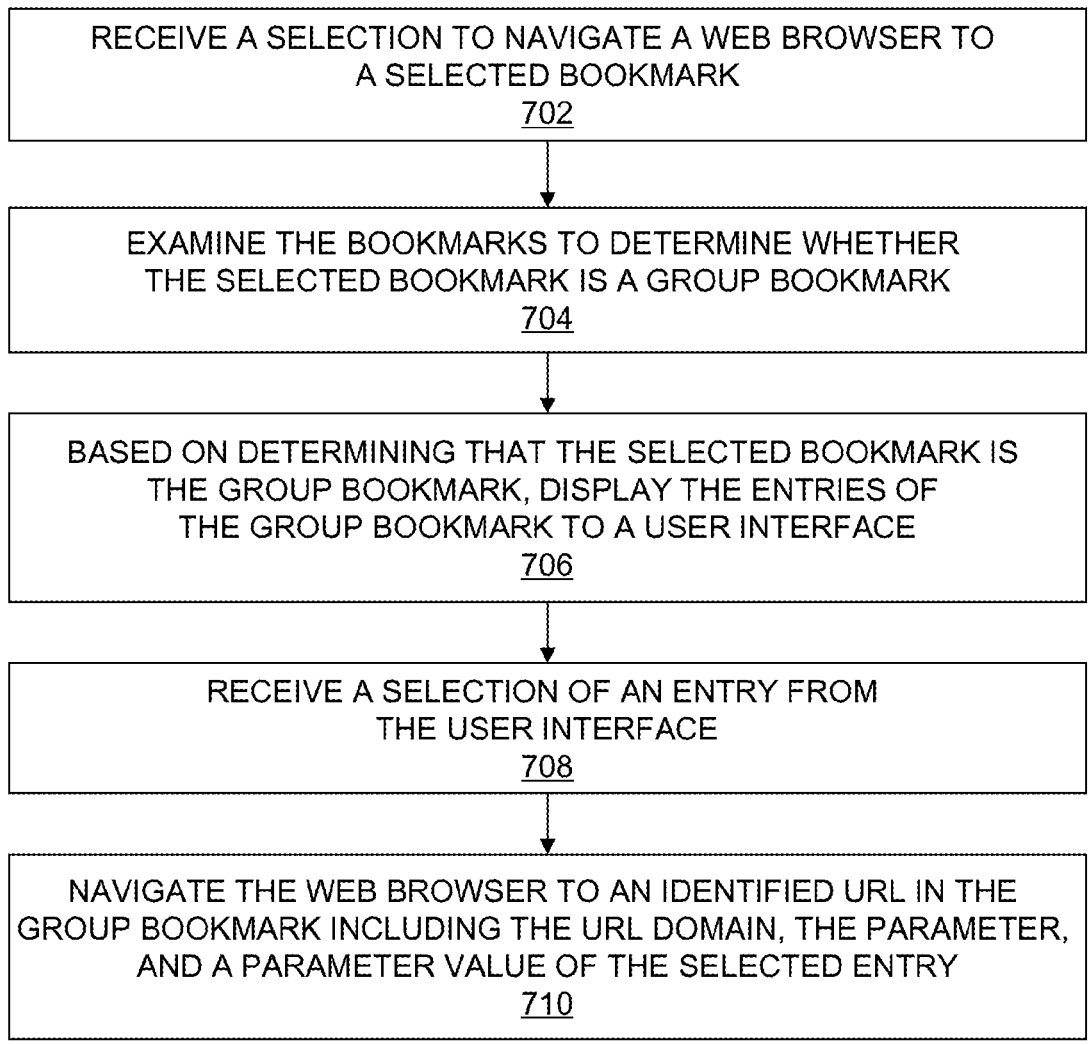
FIG. 7 depicts a flow diagram of a process for using a group bookmark according to an embodiment of the present invention.

Turning now to FIG. 7, a process 700 for using a group bookmark will now be described in an exemplary embodiment. The process 700 is described in reference to FIGS. 1-5 and can be implemented in the web browser 100 of FIG. 1 and variations thereof as depicted in web browsers 100A-N in FIG. 2. For ease of explanation, the process 700 is described in reference to web browser 100 and group bookmark logic 102 of FIG. 1. Although processes 600 and 700 are depicted separately, they may be combined into a single process.

At block 702, web browser 100 receives a selection to navigate to a selected bookmark. The selection may be in response to a user clicking on a bookmark, such as clicking on bookmark 324 via user interface 300 of FIG. 5.

At block 704, the web browser 100 passes an indication of the selected bookmark to group bookmark logic 102 to determine whether the selected bookmark is a group bookmark. The group bookmark logic 102 examines the bookmarks 104 for the selected bookmark and further determines an action in response to determining that the selected bookmark is a group bookmark.

At block 706, based on determining that the selected bookmark is the group bookmark, the entries of the group bookmark are displayed to a user interface, such as bookmark entry selection user interface 504 of FIG. 5. Displaying the entries can include displaying the parameter, a plurality of parameter values and a label associated with each of the plurality of parameter values. If a set of parameters is included in the group bookmark, selection may be requested for each parameter having more than one parameter value from which to select.

At block 708, a selection of an entry is received from the user interface. The selection can be based on one of the parameter values or the label associated with the parameter value, such as from parameter values 510 or labels 512 of FIG. 5. Alternatively, blocks 706 and 708 can be omitted if the group bookmark includes a parameter value set as a default parameter value, where the default parameter value is automatically set as the selected entry. If a set of parameters is included in the group bookmark, selection may be requested for each parameter that does not have a default parameter value defined, as a subset of the parameters may have default parameter values defined.

At block 710, the group bookmark logic 102 directs the web browser 100 to navigate to an identified URL in the group bookmark including the URL domain, the parameter, and a parameter value of the selected entry based on determining that the selected bookmark is the group bookmark. The identified URL can include a set of parameters, each parameter of the set of parameters having a corresponding parameter value.

Technical effects include creation, management, and use of group bookmarks to consolidate multiple related URLs into a single bookmark with multiple entries as different parameter values.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A system, comprising:
a computer processor; and
group bookmark logic executable by the computer processor, the group bookmark logic configured to implement a method, the method comprising:
   receiving a uniform resource locator (URL);
   parsing the URL to identify a URL domain, a context root, a path, a parameter, and a first parameter value of the parameter, wherein the URL domain, the context root, and the path target a web page that is operable to receive the parameter;
   examining multiple bookmarks to determine whether a pattern match is found for a bookmark comprising the URL domain, the context root, and the path that target the web page, the bookmark having a second parameter value of the parameter that is different from the first parameter value of the parameter;
   prompting a user to confirm whether to store the URL as a group bookmark based on the pattern match of the bookmark with the URL domain, the context root, and the path; and
   storing the first parameter value and the second parameter value with the bookmark as a group bookmark based on receiving a user confirmation to the prompting, the group bookmark comprising: a single instance of common location data that is shared by both the URL and the bookmark, the common location data comprising single instances of each of the URL domain, the context root, the path, and the parameter, and the group bookmark further comprising a plurality of entries for the values of the parameter including the first parameter value of the parameter from the URL and the second parameter value of the parameter from the bookmark.

2. The system of claim 1, further comprising:
storing a first label associated with the first parameter value to the group bookmark.

3. The system of claim 2, further comprising:
determining whether the bookmark is formatted in a group bookmark format; and
based on determining that the bookmark is not stored in the group bookmark format, converting the bookmark into the group bookmark format, prompting the user to provide a second label for the second parameter value, and storing the second label provided by the user to the group bookmark.

4. The system of claim 1, further comprising:
setting one of the first parameter value and the second parameter value as a default parameter value in response to a user selection.

5. The system of claim 1, further comprising:
receiving a selection to navigate a web browser to a selected bookmark;
examining the bookmarks to determine whether the selected bookmark is a group bookmark; and
based on determining that the selected bookmark is the group bookmark, navigating the web browser to an identified URL in the group bookmark including the URL domain, the parameter, and a parameter value of a selected entry.

6. The system of claim 5, further comprising:
displaying the entries of the group bookmark, the parameter, a plurality of parameter values and a label associated with each of the plurality of parameter values to a user interface;
outputting a prompt on the user interface to select one of the plurality of parameter values for the parameter; and
receiving a selection of the selected entry from the user interface, the selection comprising one of the parameter values or the label associated with the parameter value.

7. The system of claim 5, wherein the selected entry is a parameter value set as a default parameter value in the group bookmark.

8. The system of claim 1, wherein the parameter is one of a set of parameters of the URL, each parameter of the set of parameters having a corresponding parameter value, and the group bookmark further comprising the set of parameters and a corresponding set of one or more parameter values for each parameter.

9. A computer program product comprising a non-transitory storage medium having computer-readable program code embodied thereon, which when executed by a computer processor, causes the computer processor to implement a method, the method comprising:
receiving a uniform resource locator (URL);
parsing the URL to identify a URL domain, a context root, a path, a a parameter, and a first parameter value of the parameter, wherein the URL domain, the context root, and the path target a web page that is operable to receive the parameter;
examining multiple bookmarks by the computer processor to determine whether a pattern match is found for a bookmark comprising the URL domain, the context root, and the path that target the web page, the bookmark having a second parameter value of the parameter that is different from the first parameter value of the parameter;
prompting a user to confirm whether to store the URL as a group bookmark based on the pattern match of the bookmark with the URL domain, the context root, and the path; and
storing the first parameter value and the second parameter value with the bookmark as a group bookmark based on receiving a user confirmation to the prompting, the group bookmark comprising: a single instance of common location data that is shared by both the URL and the bookmark, the common location data comprising single instances of each of the URL domain, the context root, the path, and the parameter, and the group bookmark further comprising a plurality of entries for values of the parameter including the first parameter value of the parameter from the URL and the second parameter value of the parameter from the bookmark.

10. The computer program product of claim 9, further comprising:
storing a first label associated with the first parameter value to the group bookmark.

11. The computer program product of claim 10, further comprising:
determining whether the bookmark is formatted in a group bookmark format; and
based on determining that the bookmark is not stored in the group bookmark format, converting the bookmark into the group bookmark format, prompting the user to provide a second label for the second parameter value, and storing the second label provided by the user to the group bookmark.

12. The computer program product of claim 9, further comprising:
setting one of the first parameter value and the second parameter value as a default parameter value in response to a user selection.

13. The computer program product of claim 9, further comprising:
receiving a selection to navigate a web browser to a selected bookmark;
examining the bookmarks to determine whether the selected bookmark is a group bookmark; and
based on determining that the selected bookmark is the group bookmark, navigating the web browser to an identified URL in the group bookmark including the URL domain, the context root, the path, the parameter, and a parameter value of a selected entry.

14. The computer program product of claim 13, further comprising:
displaying the entries of the group bookmark, the parameter, a plurality of parameter values and a label associated with each of the plurality of parameter values to a user interface;
outputting a prompt on the user interface to select one of the plurality of parameter values for the parameter; and
receiving a selection of the selected entry from the user interface, the selection comprising one of the parameter values or the label associated with the parameter value.

15. The computer program product of claim 13, wherein the selected entry is a parameter value set as a default parameter value in the group bookmark.

16. The computer program product of claim 9, wherein the parameter is one of a set of parameters of the URL, each parameter of the set of parameters having a corresponding parameter value, and the group bookmark further comprising the set of parameters and a corresponding set of one or more parameter values for each parameter.

* * * * *